(12) United States Patent
Walker et al.

(10) Patent No.: US 7,649,874 B2
(45) Date of Patent: Jan. 19, 2010

(54) METHODS AND APPARATUS FOR PROVIDING POWER EFFICIENT TIME MANAGEMENT FOR MOBILE MEDIA

(75) Inventors: Gordon Kent Walker, Poway, CA (US);
George A. Wiley, San Diego, CA (US);
Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 11/372,941

(22) Filed: Mar. 9, 2006

(65) Prior Publication Data

US 2006/0233143 A1 Oct. 19, 2006

Related U.S. Application Data

(60) Provisional application No. 60/660,876, filed on Mar. 10, 2005.

(51) Int. Cl.
*H04W 4/00* (2009.01)
*H04J 3/06* (2006.01)

(52) U.S. Cl. .................. 370/338; 370/350; 370/354

(58) Field of Classification Search .................. None
See application file for complete search history.

(56) References Cited

U.S. PATENT DOCUMENTS 6,493,832 B1    12/2002    Itakura et al.
6,724,825 B1    4/2004     Nemiroff et al.
2001/0004366 A1 6/2001    Matumura et al.
2005/0190872 A1* 9/2005   Seong et al. ............. 375/354

OTHER PUBLICATIONS

Harada, S. et al.: "Development of Audio and Video Synchronous Transmission System Based on IEEE802.11A" Consumer Communications and Networking Conference, 2004. CCNC 2004 First IEEE Las Vegas, NV USA Jan. 5-8, 2004, Piscataway, NJ, USA, IEEE, Jan. 5, 2004, pp. 316-319.
Varma, Subir—Institute of Electrical and Electronics Engineers:"MPEG-2 over ATM: System Design Issues" Digest of papers of compcon 1996 technologies for the information superhighway. Santa Clara,Feb. 25-28, 1996, Digest of papers of the Computer Society Computer Conference COMPCON, Los Alamitos, IEEE COMP. Soc. Press, vol. conf. 41, Feb. 25, 1996, pp. 26-31.

* cited by examiner

*Primary Examiner*—Erika A Gary
(74) *Attorney, Agent, or Firm*—Gerald P. Joyce, III

(57) ABSTRACT

Methods and apparatus for providing power efficient time management for mobile media. In an aspect, a method is provided that operates to provide time management for mobile media that is distributed over a network. The method includes receiving the mobile media comprising source video frames that are associated with a source time reference, and capturing a portion of the source video frames. The method also includes re-labeling the portion of the source video frames based on a system time reference to produce synchronized video frames, wherein the network provides communications based on the system time reference, and assembling a transmission frame that comprises the synchronized video frames.

69 Claims, 5 Drawing Sheets

METHODS AND APPARATUS FOR PROVIDING POWER EFFICIENT TIME MANAGEMENT FOR MOBILE MEDIA

CLAIM OF PRIORITY UNDER 35 U.S.C. §119

The present application for patent claims priority to Provisional Application No. 60/660,876 filed Mar. 10, 2005, and assigned to the assignee hereof and hereby expressly incorporated by reference herein.

BACKGROUND

1. Field

The present application relates generally to the operation of media distribution systems, and more particularly, to methods and apparatus for providing power efficient time management for mobile media.

2. Background

Conventional multimedia distribution systems, utilizing technology such as MPEG2 and IP transport, depend on time stamps to allow synchronization of a receiver clock system to source media provided across a wireless link. This technique typically utilizes a local clock at the receiving device that is locked to the source media stream. Unfortunately, this consumes additional power, and can add multiple clock domains to a portable device that has stringent power consumption restrictions.

Another synchronization technique attempts to buffer enough media to assure that the receiving device is at a low risk for buffer under flow due to time base differences. However, buffering the media may result in a delay in displaying the media. Thus, adding an extra oscillator consumes additional power and buffering the media may delay its display.

Therefore, what is needed is a system that operates to provide power efficient time management for mobile media whereby receiving devices can efficiently synchronize to source media provided across a wireless link.

SUMMARY

In one or more embodiments, a synchronization system, comprising methods and apparatus, is provided that operates to provide power efficient time management for mobile media. For example, in one embodiment, the system provides a power efficient mechanism to allow receiving devices to synchronize to source media provided across a wireless link.

In an aspect, source media based on a source time reference is synchronized to a system time reference and passed across a communication system labeled as to its presentation time for discrete time events. In another aspect, rate converted media, such as audio, is reconstructed based on a client time reference available at a receiving device, and which is utilized for network synchronization. Thus, the system eliminates the need for extra oscillators or buffering at a receiving device by utilizing timing resources that already exist in the receiving device.

In an aspect, a method is provided that operates to provide time management for mobile media that is distributed over a network. The method comprises receiving the mobile media comprising source video frames that are associated with a source time reference, and capturing a portion of the source video frames. The method also comprises re-labeling the portion of the source video frames based on a system time reference to produce synchronized video frames, wherein the network provides communications based on the system time reference, and assembling a transmission frame that comprises the synchronized video frames.

In an aspect, apparatus is provided that operates to provide time management for mobile media that is distributed over a network. The apparatus comprises capture logic configured to receive source video comprising source video frames that are associated with a source time reference, and to capture a portion of the source video frames based on a system time reference, wherein the network provides communications based on the system time reference. The apparatus also comprises re-labeling logic configured to re-label one or more time indicators associated with the portion of the source video frames based the system time reference to produce synchronized video frames.

In an aspect, an apparatus is provided that provides time management for mobile media that is distributed over a network. The apparatus comprises means for receiving the mobile media comprising source video frames that are associated with a source time reference, and means for capturing a portion of the source video frames. The apparatus also comprises means for re-labeling the portion of the source video frames based on a system time reference to produce synchronized video frames, wherein the network provides communications based on the system time reference, and means for assembling a transmission frame that comprises the synchronized video frames.

In an aspect, a computer-readable medium is provided that has a computer program, which when executed by at least one processor, operates to provide time management for mobile media that is distributed over a network. The computer program comprises instructions for receiving the mobile media comprising source video frames that are associated with a source time reference, and instructions for capturing a portion of the source video frames. The computer program also comprises instructions for re-labeling the portion of the source video frames based on a system time reference to produce synchronized video frames, wherein the network provides communications based on the system time reference, and instructions for assembling a transmission frame that comprises the synchronized video frames.

In an aspect, at least one processor is provided that is configured to perform a method for providing time management for mobile media that is distributed over a network. The method comprises receiving the mobile media comprising source video frames that are associated with a source time reference, and capturing a portion of the source video frames. The method also comprises re-labeling the portion of the source video frames based on a system time reference to produce synchronized video frames, wherein the network provides communications based on the system time reference, and assembling a transmission frame that comprises the synchronized video frames.

In an aspect, a method is provided that operates to provide time management for mobile media that is distributed over a network. The method comprises receiving the mobile media comprising source audio that is associated with a source time reference, and transcoding the source audio based on a system time reference to produce synchronized audio, wherein the network provides communications based on the system time reference. The method also comprises assembling a transmission frame that comprises the synchronized audio.

In an aspect, an apparatus is provided that operates to provide time management for mobile media that is distributed over a network. The apparatus comprises a transcoder configured to receive the mobile media comprising source audio that is associated with a source time reference, and to transcode the source audio based on a system time reference to produce synchronized audio, wherein the network provides communications based on the system time reference. The apparatus also comprises transmission logic configured to assemble a transmission frame that comprises the synchronized audio.

In an aspect, an apparatus is provided that operates to provide time management for mobile media that is distributed over a network. The apparatus comprises means for receiving the mobile media comprising source audio that is associated with a source time reference, and means for transcoding the source audio based on a system time reference to produce synchronized audio, wherein the network provides communications based on the system time reference. The apparatus also comprises means for assembling a transmission frame that comprises the synchronized audio.

In an aspect, a computer-readable medium is provide that has a computer program, which when executed by at least one processor, operates to provide time management for mobile media that is distributed over a network. The computer program comprises instructions for receiving the mobile media comprising source audio that is associated with a source time reference, and instructions for transcoding the source audio based on a system time reference to produce synchronized audio, wherein the network provides communications based on the system time reference. The computer program also comprises instructions for assembling a transmission frame that comprises the synchronized audio.

In an aspect, at least one processor is provided that is configured to perform a method for providing time management for mobile media that is distributed over a network. The method comprises receiving the mobile media comprising source audio that is associated with a source time reference, and transcoding the source audio based on a system time reference to produce synchronized audio, wherein the network provides communications based on the system time reference. The method also comprises assembling a transmission frame that comprises the synchronized audio.

In an aspect, a method is provided that operates to provide time management for mobile media that is distributed over a network. The method comprises receiving a transmission frame over the network using a client time reference that is synchronized to the network. The method also comprises obtaining synchronized data from the transmission frame, and decoding the synchronized data using the client time reference.

In an aspect, an apparatus is provided that operates to provide time management for mobile media that is distributed over a network. The apparatus comprises means for receiving a transmission frame over the network using a client time reference that is synchronized to the network. The apparatus also comprises means for obtaining synchronized data from the transmission frame, and means for decoding the synchronized data using the client time reference.

In an aspect, an apparatus is provided that operates to provide time management for mobile media that is distributed over a network. The apparatus comprises receiving logic configured to receive a transmission frame over the network using a client time reference that is synchronized to the network, and a decoder configured to obtain synchronized data from the transmission frame, and to decode the synchronized data using the client time reference.

In an aspect, a computer-readable medium is provided that has a computer program, which when executed by at least one processor, operates to provide time management for mobile media that is distributed over a network. The computer program comprises instructions for receiving a transmission frame over the network using a client time reference that is synchronized to the network, instructions for obtaining synchronized data from the transmission frame, and instructions for decoding the synchronized data using the client time reference.

In an aspect, at least one processor is provided that is configured to perform a method for providing time management for mobile media that is distributed over a network. The method comprises receiving a transmission frame over the network using a client time reference that is synchronized to the network, obtaining synchronized data from the transmission frame, and decoding the synchronized data using the client time reference.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

In one or more embodiments, a synchronization system, comprising methods and apparatus, is provided that operates to provide power efficient time management for mobile media. In one embodiment, mobile media is synchronized to a system time reference that forms the basis for communications over a distribution network. Devices in communication with the distribution network may comprise an existing client time reference that is synchronized to the system time reference. The system time reference may be shared with another physical layer. When the synchronized mobile media is distributed over the distribution network, a receiving device need only use its existing client time reference to receive and decode the media. Thus, power and cost efficiency is provided because receiving devices do not need additional oscillators or time bases to decode and render the synchronized mobile media.

The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
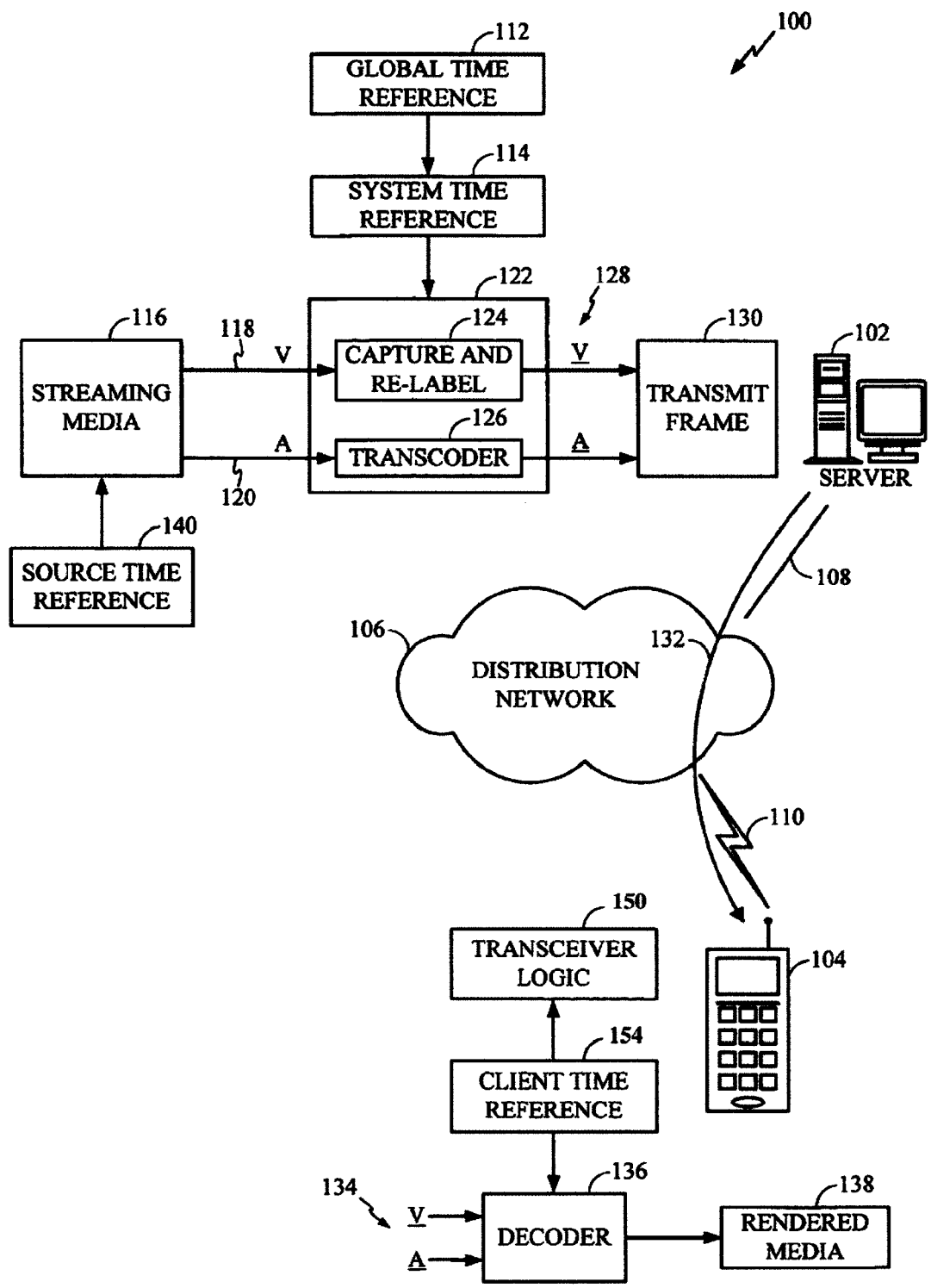
FIG. 1 shows a network that comprises one embodiment of a synchronization system.

FIG. 1 shows a network that comprises one embodiment of a synchronization system. The network 100 comprises a server 102 that communicates over a distribution network 106. In one embodiment, the server 102 operates to communicate with the network 106 using any type of communication link 108. The network 106 may be any type of wired and/or wireless network. The network 106 communicates with one or more devices, such as device 104, using any suitable type of wireless communication link 110. Thus, the server 102 is operable to transmit streaming media to the device 104. Although only one device is shown, the system is suitable for use with any number or types of devices.

In one embodiment, the network 106 operates using code division multiple access (CDMA) communication technology that is frequency synchronized utilizing a global time standard or common time reference, such as that provided by a global positioning system (GPS) time standard. For example, in one embodiment, the global time reference 112 comprises GPS logic and is operable to acquire a GPS time reference. Time parameters from the global time reference 112 are used to derive a system time reference 114. The system time reference 114 operates to provide system timing that is used throughout the distribution network 106. For example, the device 104 comprises a client time reference 154 that can be synchronized to the system time reference 114 so that the device 104 can communicate over the distribution network 106. It should be noted that embodiments of the synchronization system may operate with any network using virtually any communication technology based on any suitable time reference.

Streaming media content 116 is available at the server 102 for distribution over the network 106. The streaming media 116 comprises source video frames (V) 118 and source audio (A) 120 that are associated with a source time reference 140. In one embodiment, the streaming media 116 may comprise any other type of media, such as text and/or graphics that may be synchronized to the source time reference. In one embodiment, the source video 118 and the source audio 120 are input to synchronization logic 122 that operates to synchronize the source video 118 and the source audio 120 to the system time reference 114 to produce synchronized video (V) and audio (A), shown generally at 128.

The synchronization logic 122 comprises frame capture and re-labeling logic 124 and a transcoder 126. The synchronization logic 122 receives timing signals from the system time reference 114 and uses these signals to control the operation of the frame capture and re-labeling logic 124 and the transcoder 126.

In one embodiment, the frame capture and re-labeling logic 124 operates to receive a sequence of source video frames 118 that are based on the source time reference 140. The source video frames 118 represent discrete time events that are associated with a presentation time stamp (PTS) that identifies a time at which an element of source media is to be output from a decoding device. The frame capture and re-labeling logic 124 operates to capture and re-label a portion of these source video frames 118 for inclusion into a network transmission frame 130. For example, a portion of the source video frames 118 are captured and re-labeled with a time identifier that is based on the system time reference 114.

In one embodiment, the transcoder 126 operates to receive the source audio signal 120 that is based on the source time reference 140 and transcode it to the synchronized audio signal A based on the system time reference 114. For example, the transcoder 126 may use any processing technique, such as rate interpolation, to transcode the source audio 120 to the synchronized audio A.

As a result of the operation of the synchronization logic 122, the streaming media 116 is processed to produce synchronized streaming media 128 that is synchronized with the system time reference 114. Thus, network transmission frames (i.e., transmission frame 130) containing the synchronized streaming media 128 can then be transmitted over the network 106, as shown by path 130, to receiving devices, such as at the device 104.

In one embodiment, the transmission frame 130 comprises a selected time duration of information. For example, it will be assumed that the transmission frame 130 comprises one second of information. Assuming that the source video 118 comprises video frames at thirty (30) frames per second, approximately thirty source video frames are captured and relabeled from the source video 118 to be included as synchronized video V in each transmission frame. The number of frames is approximate because the source time reference 140 and the system time reference 114 may be asynchronous to each other, and so it is possible that only twenty-nine source frames will be captured and relabeled into the transmission frame 130.

The device 104 comprises a client time reference 154, a transceiver 150, and a decoder 136. In one embodiment, the transceiver 150 comprises logic to receive and logic to transmit information over the network 106. In one embodiment, the transceiver 150 uses the client time reference 154 to synchronize to the network 106. The transceiver 150 receives the transmission frames from the distribution network 106 and outputs the synchronized streaming media, as shown at 134. For example, the synchronized streaming media may comprise any synchronizable data. The synchronized streaming media 134 is input to a decoder 136 that uses the client time reference 154 to decode the synchronized video frames V and transcoded audio A to reproduce the streaming media that is rendered at the device, as shown at 138. The decoder 136 comprises any suitable hardware, firmware, and/or software. Because the synchronized streaming media 134 is synchronized to the system time reference, the device 104 only needs to use its client time reference 154 to decode the information. Thus, additional oscillators or time bases are not required for the device 104 to decode the synchronized media 134.

Therefore, embodiments of the synchronization system operate to efficiently synchronize streaming media associated with a source time reference to a system time reference. The synchronized media can be decoded and rendered by a device utilizing an existing client time reference that is used to provide communications over a distribution network. As the result, additional device oscillators or time bases are not necessary, thereby conserving cost and device power. It should be noted that the network 100 is just one implementation and that other implementations are possible within the scope of the embodiments.

Figure 2:
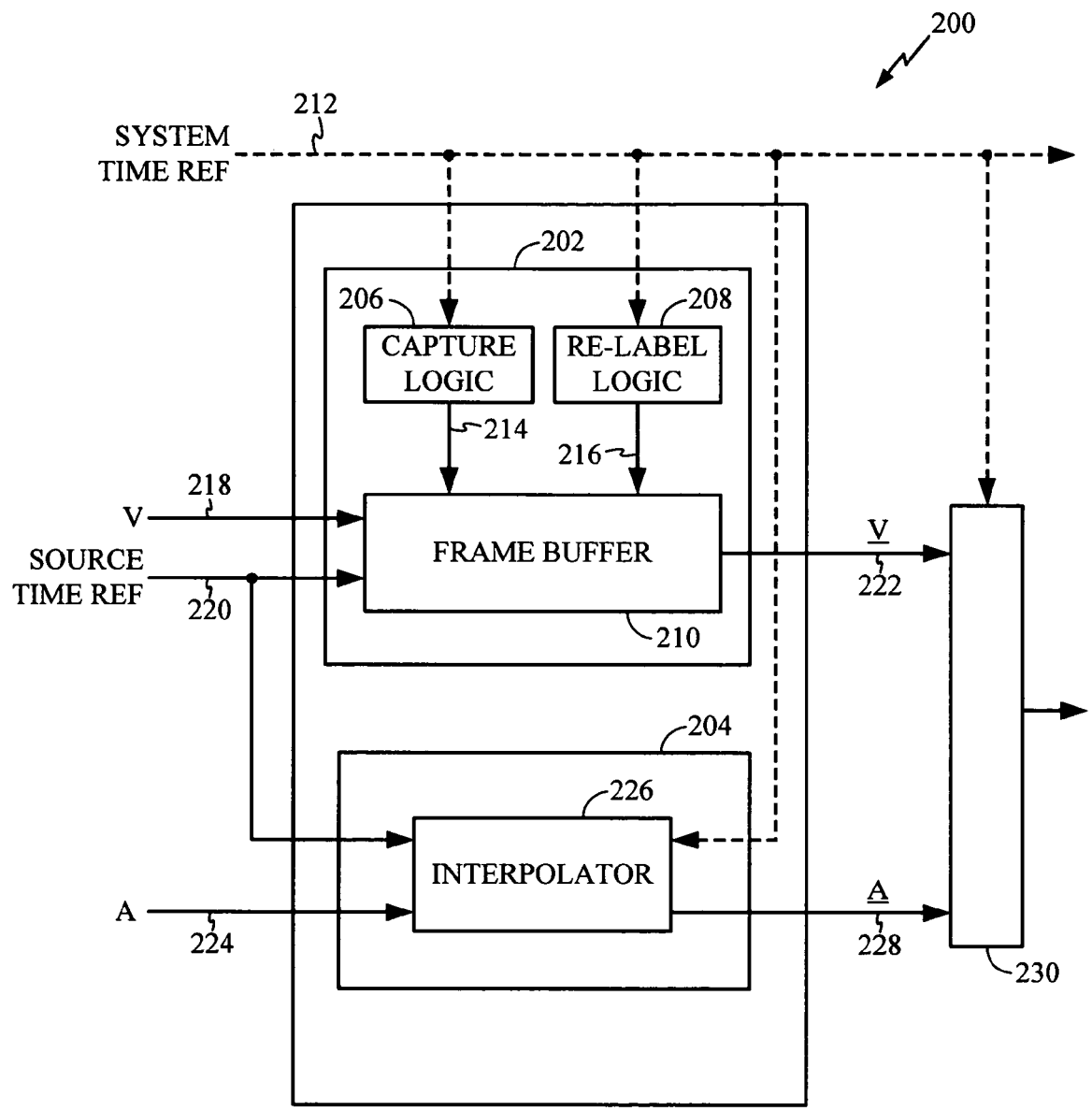
FIG. 2 shows one embodiment of synchronization logic for use in embodiments of a synchronization system.

FIG. 2 shows one embodiment of synchronization logic 200 for use in embodiments of a synchronization system. For example, the synchronization logic 200 is suitable for use as the synchronization logic 122 shown in FIG. 1.

The synchronization logic 200 comprises a CPU, processor, gate array, hardware logic, memory elements, virtual machine, software, and/or any combination of hardware and software. In one embodiment, the synchronization logic 200 comprises video frame capture and re-labeling logic 202 and audio transcoder 204.

The video frame capture and re-labeling logic 202 comprises capture logic 206, re-label logic 208, and frame buffer 210. The capture logic 206 comprises any combination of hardware and/or software and is configured to receive a system time reference signal 212 and generate a capture signal 214 that is input to the frame buffer 210. The re-label logic 208 comprises any combination of hardware and/or software and is configured to receive a system time reference signal 212 and generate a re-label signal 216 that is input to the frame buffer 210.

The frame buffer 210 comprises any combination of hardware and/or software and is configured to receive source video frames 218, the capture signal 214, and the re-label signal 216. The source video frames 218 are synchronized to a source time reference 220. The frame buffer 210 operates to capture and re-label a portion of the received source frames 218 using the capture signal 214 and a re-label signal 216. For example, it will be assumed that the source time reference 220 and the system time reference 212 are asynchronous to each other. It will further be assumed that a network transmission frame is defined to comprise one second of data. Based on these operating parameters, the capture logic 206 will output the capture signal 214 once per second. During any one second interval, the frame buffer 210 will receive approximately thirty source frames 218. For example, because of the asynchronous timing, it is possible that only twenty-nine source frames 218 will be received during a particular one second interval.

The frame buffer 210 operates to capture source video frames 218 when it receives the capture signal 214. The frame buffer 210 then operates to re-label the captured frames based on the re-label signal 216. For example, the source video frames 218 have an associated PTS, and the frame buffer 208 operates to re-label the captured video frames based on a new time stamp provided by the re-label signal 216. In one embodiment, the new time stamp is added to the frame without affecting any existing time stamps. For example, the re-label signal could produce new time stamps that are at a fixed offset from the existing time stamps. This enables transmission of all captured video frames without loss of any video frame. As a result, a portion of the source video frames 216 are captured and re-labeled based on the system time reference to form synchronized video frames 222.

The audio transcoder 204 comprises any combination of hardware and/or software and is configured to receive source audio 224, the source time reference 220, and the system time reference 212. In one embodiment, the transcoder 204 comprises interpolator 226. The interpolator 226 operates to interpolate the source audio 224 to produce synchronized audio 228 that is synchronized to the system time reference 212. For example, in one embodiment, the interpolator 226 utilizes a polyphase filter with many taps to rate interpolate the source audio 224 to produce synchronized audio 228. It should be noted that any type of synchronization technique may be performed by the audio transcoder 204 to produce the synchronized audio 228.

Once the synchronized video 222 and audio 228 are generated, they are input to transmission logic 230 that operates to generate a transmission frame for transmission over a distribution network. The transmission logic 230 may comprise hardware, software or any suitable combination thereof.

In one embodiment, the synchronization system comprises one or more program instructions ("program instructions") stored on a computer-readable medium, which when executed by at least one processor, provides the functions described herein. For example, the program instructions may be loaded into the synchronization logic 200 from a computer-readable medium, such as a floppy disk, CDROM, memory card, FLASH memory device, RAM, ROM, or any other type of memory device or computer-readable medium that interfaces to the synchronization logic 200. In another embodiment, the instructions may be downloaded into the synchronization logic 200 from an external device or network resource. The program instructions, when executed by the synchronization logic 200, provide embodiments of a synchronization system as described herein.

As a result, embodiments of the synchronization system operate to efficiently synchronize streaming source media associated with a source time reference to a system time reference. The synchronized media can be decoded and rendered by a device utilizing an existing client time reference that is used to provide communications over a distribution network. It should be noted that the synchronization logic 200 is just one implementation and that other implementations are possible within the scope of the embodiments.

Figure 3:
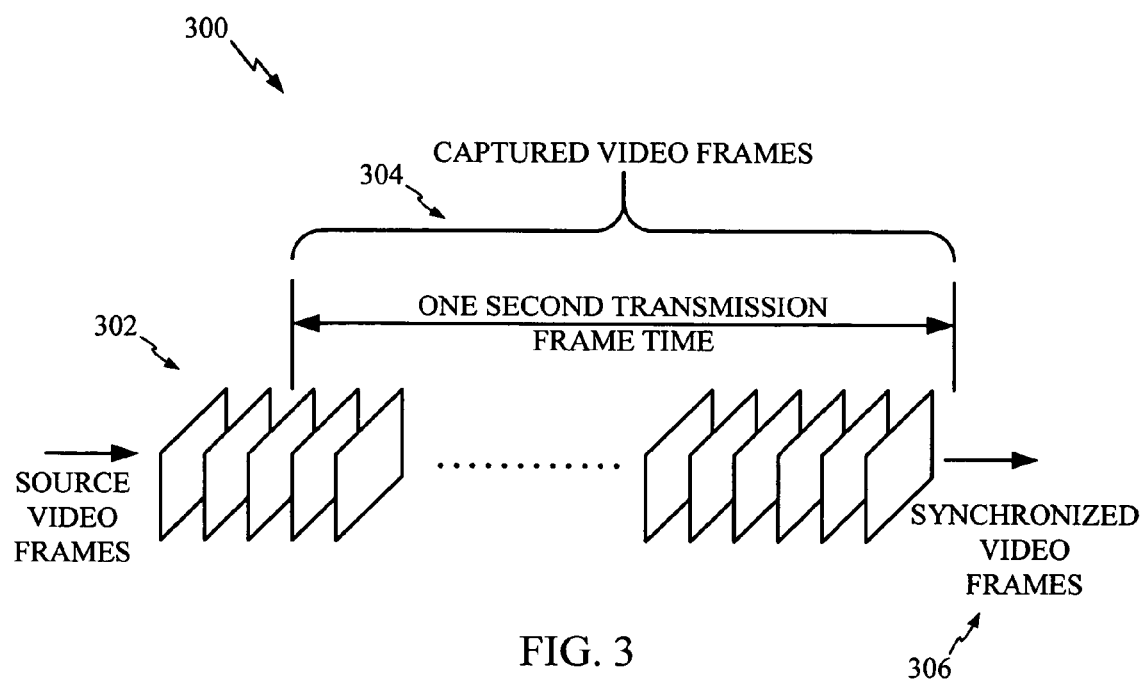
FIG. 3 shows a graphical representation that illustrates how embodiments of the synchronization system operate to synchronize source video frames to a system time reference.

FIG. 3 shows a graphical representation 300 that illustrates how embodiments of the synchronization system operate to synchronize source video frames to a system time reference. For clarity, the representation 300 is described with reference to the synchronization logic 200 shown in FIG. 2.

Source video frames 302 are received at the frame buffer 210 of the frame capture and re-labeling logic 202. The capture logic 206 outputs the capture signal 214 on the system time reference 212. As a result, the frame buffer 210 comprises captured video frames 304. The captured video frames 304 are then re-labeled with a new PTS that is derived from the system time reference 212. For example the re-label logic 208 outputs a re-label signal 216 is used to re-label the captured frames. The captured and re-labeled frames are then output from the frame buffer 210 as synchronized video frames 306. Because the system time reference and the source time reference are asynchronous, the number of source frames capture for each second may vary.

Figure 4:
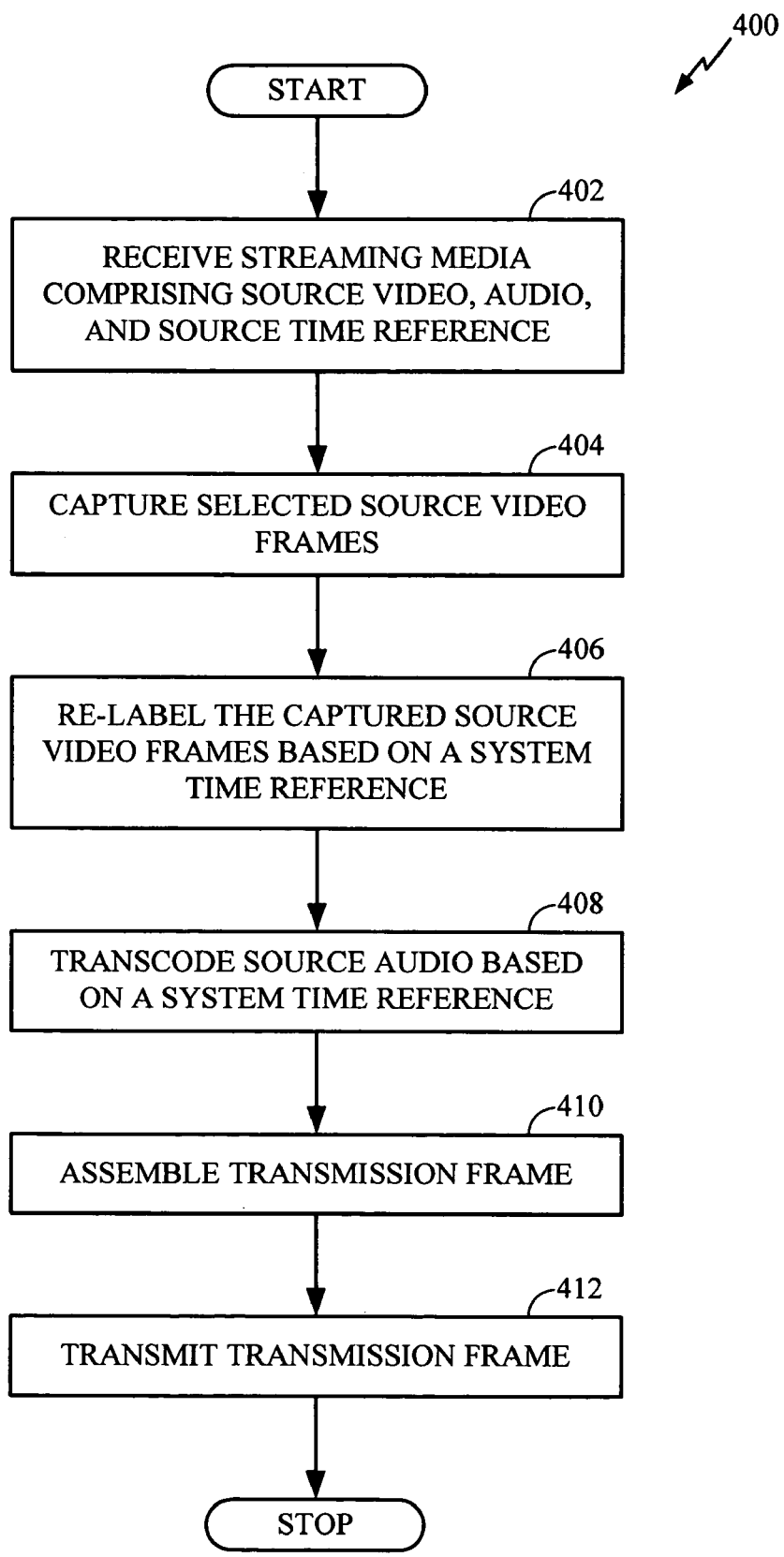
FIG. 4 shows one embodiment of a method for use in embodiments of a synchronization system.

FIG. 4 shows one embodiment of a method 400 for operating synchronization logic for use in embodiments of a synchronization system. For clarity, the method 400 is described herein with reference to the synchronization logic 200 shown in FIG. 2. For example, in one embodiment, the synchronization logic 200 executes machine-readable instructions to perform the functions described below.

At block 402, streaming media is received for distribution over a distribution network. For example, the streaming media comprises source video frames and source audio that are synchronized to a source time reference. In one embodiment, the frame capture and re-labeling logic 202 receives the source video frames and the transcoder 204 receives the source audio.

At block 404, source video frames are captured based on a system time reference. For example, the system time reference is a time reference that is synchronized to the operation of a distribution network. In one embodiment, the capture and re-labeling logic 202 operates to capture selected source video frames based on a capture signal 214 derived from the system time reference. For example, a transmission frame is defined to comprise a selected number of synchronized video frames and a selected number of source video frames are captured as described above to be included in the transmission frame.

At block 406, captured source video frames are re-labeled based on a system time reference. In one embodiment, the capture and re-labeling logic 202 operates to re-label the captured source video frames based on a re-label signal 216 derived from the system time reference. For example, the captured source video frames are re-labeled with a new PTS that is based on the system time reference.

At block 408, source audio is transcoded to produce synchronized audio that is synchronized to the system time reference. For example, the transcoder 204 receives the source audio 224, the source reference 220, and the system time reference 212, and produces synchronized audio 228. In one embodiment, the transcoder 204 operates to perform interpolation to synchronize the source audio with the system time reference. However, any transcoding technique may be used to synchronize the source audio to the system time reference.

At block 410, a transmission frame is assembled to comprise the synchronized video and audio. For example, the transmission logic 230 receives the synchronized video frames 222 and the transcoded audio 228 and assembles a transmission frame for transmission over a distribution network.

At block 412, the transmission frame is transmitted over a distribution network for reception by authorized devices. Because the synchronized video frames 222 and the transcoded audio 228 included in the transmission frame are synchronized to the system time reference, a receiving device can decode the synchronized video frames 222 and the transcoded audio 228 using a client time reference that is used to provide communications over the distribution network.

Thus, the method 400 operates to provide one embodiment of a synchronization system. It should be noted that the method 400 represents just one implementation and that other implementations are possible within the scope of the embodiments.

Figure 5:
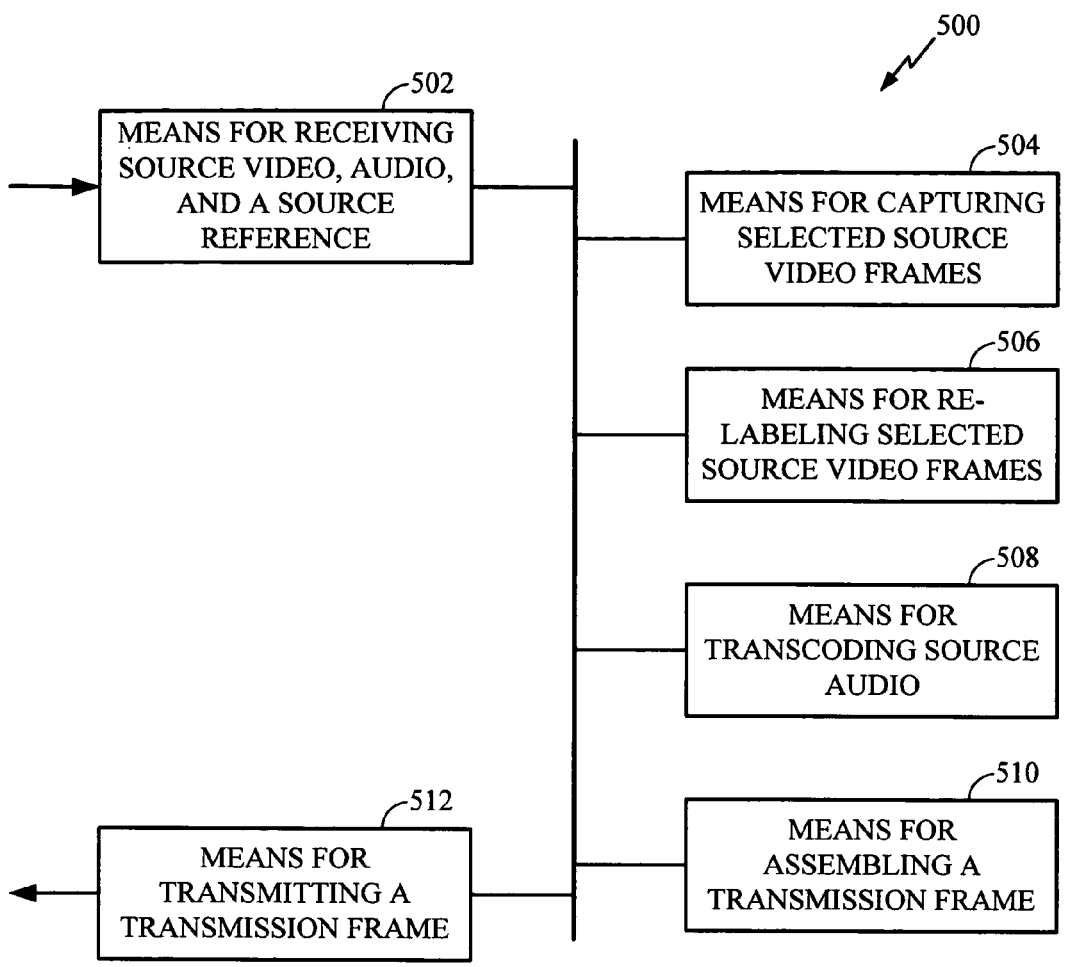
FIG. 5 shows one embodiment of synchronization logic for use in embodiments of a synchronization system.

FIG. 5 shows one embodiment of synchronization logic 500 for use in embodiments of a synchronization system. For example, the synchronization logic 500 is suitable for use as the synchronization logic 122 shown in FIG. 1.

The synchronization logic 500 comprises means (502) for receiving source video, audio, and a source time reference. The synchronization logic 500 also comprises means (504) for capturing selected source video frames, means (506) for re-labeling selected source video frames, means (508) for transcoding source audio, means (510) for assembling a transmission frame, and means (512) for transmitting a transmission frame. The means (502 through 512) comprise hardware, software, and/or any combination thereof. In one embodiment, the means (502 through 512) comprise at least one processor configured to execute machine readable instructions to perform the functions of the synchronization system as described herein.

Figure 6:
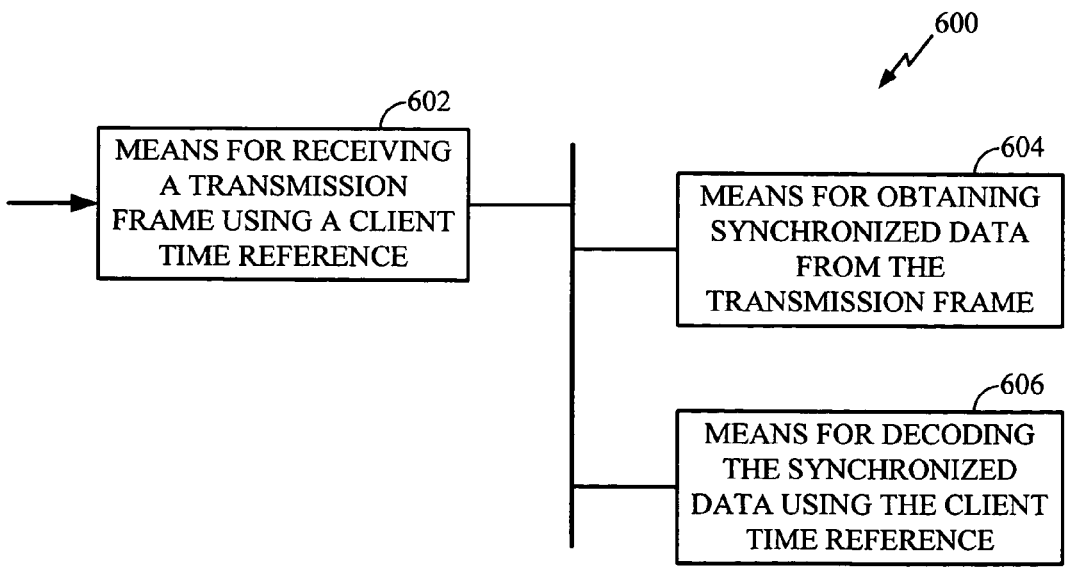
FIG. 6 shows one embodiment of a device for use in embodiments of a synchronization system.

FIG. 6 shows one embodiment of a device 600 for use in embodiments of a synchronization system. For example, the device 600 is suitable for use as the device 104 shown in FIG. 1.

The device 600 comprises means (602) for receiving a transmission frame using a client time reference, means (604) for obtaining synchronized data from the transmission frame, and means (606) for decoding the synchronized data using the client time reference. The means (602 through 606) comprise hardware, software, and/or any combination thereof. In one embodiment, the means (602 through 606) comprise at least one processor configured to execute machine readable instructions to perform the functions of the synchronization system as described herein.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a synchronization system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for providing time management for mobile media that is distributed over a wireless network, the method comprising:
    receiving the mobile media comprising source video frames that are associated with a source time reference;
    capturing a portion of the source video frames;
    re-labeling the portion of the source video frames based on a system time reference to produce synchronized video frames, wherein the wireless network provides communications based on the system time reference and the system time reference is different than the source time reference; and
    assembling a transmission frame that comprises the synchronized video frames.

2. The method of claim 1, further comprising:
    receiving the mobile media comprising source audio that is associated with the source time reference;
    transcoding the source audio based on the system time reference to produce synchronized audio; and
    assembling the transmission frame to comprise the synchronized audio.

3. The method of claim 2, wherein said transcoding comprises interpolating the source audio based on the system time reference to produce the synchronized audio.

4. The method of claim 1, wherein said re-labeling comprises re-labeling one or more time indicators associated with the portion of the source video frames to one or more synchronized time indicators associated with the system time reference.

5. The method of claim 1, further comprising transmitting the transmission frame over the wireless network wherein the wireless network is synchronized to a common time reference.

6. Apparatus for providing time management for mobile media that is distributed over a wireless network, the apparatus comprising:
   capture logic configured to receive the mobile media comprising source video frames that are associated with a source time reference, and to capture a portion of the source video frames based on a system time reference, wherein the wireless network provides communications based on the system time reference and the system time reference is different than the source time reference; and
   re-labeling logic configured to re-label one or more time indicators associated with the portion of the source video frames based the system time reference to produce synchronized video frames.

7. The apparatus of claim 6, further comprising:
   transcoder logic configured to receive the mobile media comprising source audio that is associated with the source time reference, and to transcode the source audio based on the system time reference to produce synchronized audio.

8. The apparatus of claim 7, wherein said transcoder logic is configured to rate interpolate the source audio based on the system time reference to produce the synchronized audio.

9. The apparatus of claim 6, further comprising transmission logic configured to assemble the synchronized video frames and the synchronized audio into a transmission frame for distribution over the wireless network wherein the wireless network is synchronized to a common time reference.

10. Apparatus for providing time management for mobile media that is distributed over a wireless network, the apparatus comprising:
    means for receiving the mobile media comprising source video frames that are associated with a source time reference;
    means for capturing a portion of the source video frames;
    means for re-labeling the portion of the source video frames based on a system time reference to produce synchronized video frames, wherein the wireless network provides communications based on the system time reference and the system time reference is different than the source time reference; and
    means for assembling a transmission frame that comprises the synchronized video frames.

11. The apparatus of claim 10, further comprising:
    means for receiving the mobile media comprising source audio that is associated with the source time reference;
    means for transcoding the source audio based on the system time reference to produce synchronized audio; and
    means for assembling the transmission frame to comprise the synchronized audio.

12. The apparatus of claim 11, wherein said means for transcoding comprises means for interpolating the source audio based on the system time reference to produce the synchronized audio.

13. The apparatus of claim 10, wherein said means for re-labeling comprises means for re-labeling one or more time indicators associated with the portion of the source video frames to one or more synchronized time indicators associated with the system time reference.

14. The apparatus of claim 10, further comprising means for transmitting the transmission frame over the wireless network wherein the wireless network is synchronized to a common time reference.

15. A computer-readable medium having a computer program, which when executed by at least one processor, operates to provide time management for mobile media that is distributed over a wireless network, the computer program comprising:
    instructions for receiving the mobile media comprising source video frames that are associated with a source time reference;
    instructions for capturing a portion of the source video frames;
    instructions for re-labeling the portion of the source video frames based on a system time reference to produce synchronized video frames, wherein the wireless network provides communications based on the system time reference and the system time reference is different than the source time reference; and
    instructions for assembling a transmission frame that comprises the synchronized video frames.

16. The computer-readable medium of claim 15, further comprising:
    instructions for receiving the mobile media comprising source audio that is associated with the source time reference;
    instructions for transcoding the source audio based on the system time reference to produce synchronized audio; and
    instructions for assembling the transmission frame to comprise the synchronized audio.

17. The computer-readable medium of claim 16, wherein said instructions for transcoding comprise instructions for interpolating the source audio based on the system time reference to produce the synchronized audio.

18. The computer-readable medium of claim 15, wherein said instructions for re-labeling comprise instructions for re-labeling one or more time indicators associated with the portion of the source video frames to one or more synchronized time indicators associated with the system time reference.

19. The computer-readable medium of claim 15, further comprising instructions for transmitting the transmission frame over the wireless network wherein the wireless network is synchronized to a common time reference.

20. At least one processor configured to perform a method for providing time management for mobile media that is distributed over a wireless network, the method comprising:
    receiving the mobile media comprising source video frames that are associated with a source time reference;
    capturing a portion of the source video frames;
    re-labeling the portion of the source video frames based on a system time reference to produce synchronized video frames, wherein the wireless network provides communications based on the system time reference and the system time reference is different than the source time reference; and
    assembling a transmission frame that comprises the synchronized video frames.

21. The method of claim 20, further comprising:
    receiving the mobile media comprising source audio that is associated with the source time reference;
    transcoding the source audio based on the system time reference to produce synchronized audio; and
    assembling the transmission frame to comprise the synchronized audio.

22. The method of claim 21, wherein said transcoding comprises interpolating the source audio based on the system time reference to produce the synchronized audio.

23. The method of claim 20, wherein said re-labeling comprises re-labeling one or more time indicators associated with the portion of the source video frames to one or more synchronized time indicators associated with the system time reference.

24. The method of claim 20, further comprising transmitting the transmission frame over the wireless network wherein the wireless network is synchronized to a common time reference.

25. A method for providing time management for mobile media that is distributed over a wireless network, the method comprising:
receiving the mobile media comprising source audio that is associated with a source time reference;
transcoding the source audio based on a system time reference to produce synchronized audio, wherein the wireless network provides communications based on the system time reference and the system time reference is different than the source time reference; and
assembling a transmission frame that comprises the synchronized audio.

26. The method of claim 25, further comprising:
receiving the mobile media comprising source video frames that are associated with the source time reference;
capturing a portion of the source video frames;
re-labeling the portion of the source video frames based on the system time reference to produce synchronized video frames; and
assembling the transmission frame to comprise the synchronized video frames.

27. The method of claim 26, wherein said re-labeling comprises re-labeling one or more time indicators associated with the portion of the source video frames to one or more synchronized time indicators associated with the system time reference.

28. The method of claim 25, wherein said transcoding comprises interpolating the source audio based on the system time reference to produce the synchronized audio.

29. The method of claim 25, further comprising transmitting the transmission frame over the wireless network wherein the wireless network is synchronized to a common time reference.

30. Apparatus for providing time management for mobile media that is distributed over a wireless network, the apparatus comprising:
a transcoder configured to receive the mobile media comprising source audio that is associated with a source time reference, and to transcode the source audio based on a system time reference to produce synchronized audio, wherein the wireless network provides communications based on the system time reference and the system time reference is different than the source time reference; and
transmission logic configured to assemble a transmission frame that comprises the synchronized audio.

31. The apparatus of claim 30, further comprising:
capture logic configured to receive the mobile media comprising source video frames that are associated with a source time reference, and to capture a portion of the source video frames based on the system time reference; and
re-labeling logic configured to re-label one or more time indicators associated with the portion of the source video frames based the system time reference to produce synchronized video frames that are included in the transmission frame.

32. The apparatus of claim 31, wherein said re-labeling comprises re-labeling one or more time indicators associated with the portion of the source video frames to one or more synchronized time indicators associated with the system time reference.

33. The apparatus of claim 30, wherein said transcoder comprises an interpolator configured to interpolate the source audio based on the system time reference to produce the synchronized audio.

34. The apparatus of claim 30, further comprising transmission logic configured to transmit the transmission frame over the wireless network wherein the wireless network is synchronized to a common time reference.

35. Apparatus for providing time management for mobile media that is distributed over a wireless network, the apparatus comprising:
means for receiving the mobile media comprising source audio that is associated with a source time reference;
means for transcoding the source audio based on a system time reference to produce synchronized audio, wherein the wireless network provides communications based on the system time reference and the system time reference is different than the source time reference; and
means for assembling a transmission frame that comprises the synchronized audio.

36. The apparatus of claim 35, further comprising:
means for receiving the mobile media comprising source video frames that are associated with the source time reference;
means for capturing a portion of the source video frames;
means for re-labeling the portion of the source video frames based on the system time reference to produce synchronized video frames; and
means for assembling the transmission frame to comprise the synchronized video frames.

37. The apparatus of claim 36, wherein said means for re-labeling comprises means for re-labeling one or more time indicators associated with the portion of the source video frames to one or more synchronized time indicators associated with the system time reference.

38. The apparatus of claim 35, wherein said means for transcoding comprises means for interpolating the source audio based on the system time reference to produce the synchronized audio.

39. The apparatus of claim 35, further comprising means for transmitting the transmission frame over the wireless network wherein the wireless network is synchronized to a common time reference.

40. A computer-readable medium having a computer program, which when executed by at least one processor, operates to provide time management for mobile media that is distributed over a wireless network, the computer program comprising:
instructions for receiving the mobile media comprising source audio that is associated with a source time reference;
instructions for transcoding the source audio based on a system time reference to produce synchronized audio, wherein the wireless network provides communications based on the system time reference and the system time reference is different than the source time reference; and
instructions for assembling a transmission frame that comprises the synchronized audio.

41. The computer program of claim 40, further comprising:
instructions for receiving the mobile media comprising source video frames that are associated with the source time reference;
instructions for capturing a portion of the source video frames;
instructions for re-labeling the portion of the source video frames based on the system time reference to produce synchronized video frames; and
instructions for assembling the transmission frame to comprise the synchronized video frames.

42. The computer program of claim 41, wherein said instructions for re-labeling comprise instructions for re-labeling one or more time indicators associated with the portion of the source video frames to one or more synchronized time indicators associated with the system time reference.

43. The computer program of claim 40, wherein said instructions for transcoding comprise instructions for interpolating the source audio based on the system time reference to produce the synchronized audio.

44. The computer program of claim 40, further comprising instructions for transmitting the transmission frame over the wireless network wherein the wireless network is synchronized to a common time reference.

45. At least one processor configured to perform a method for providing time management for mobile media that is distributed over a wireless network, the method comprising:
receiving the mobile media comprising source audio that is associated with a source time reference;
transcoding the source audio based on a system time reference to produce synchronized audio, wherein the wireless network provides communications based on the system time reference and the system time reference is different than the source time reference; and
assembling a transmission frame that comprises the synchronized audio.

46. The method of claim 45, further comprising:
receiving the mobile media comprising source video frames that are associated with the source time reference;
capturing a portion of the source video frames;
re-labeling the portion of the source video frames based on the system time reference to produce synchronized video frames; and
assembling the transmission frame to comprise the synchronized video frames.

47. The method of claim 46, wherein said re-labeling comprises re-labeling one or more time indicators associated with the portion of the source video frames to one or more synchronized time indicators associated with the system time reference.

48. The method of claim 45, wherein said transcoding comprises interpolating the source audio based on the system time reference to produce the synchronized audio.

49. The method of claim 45, further comprising transmitting the transmission frame over the wireless network wherein the wireless network is synchronized to a common time reference.

50. A method for providing time management for mobile media that is distributed over a wireless network, the method comprising:
receiving a transmission frame over the wireless network using a client time reference that is synchronized to the wireless network;
obtaining synchronized data labeled based on the client time reference from the transmission frame; and
decoding the synchronized data using the client time reference.

51. The method of claim 50, wherein said decoding comprises decoding synchronized video frames from the transmission frame.

52. The method of claim 50, wherein said decoding comprises decoding synchronized audio from the transmission frame.

53. The method of claim 50, wherein said receiving comprises receiving the transmission frame over the wireless network wherein the wireless network is synchronized to a common time reference.

54. Apparatus for providing time management for mobile media that is distributed over a wireless network, the apparatus comprising:
means for receiving a transmission frame over the wireless network using a client time reference that is synchronized to the wireless network;
means for obtaining synchronized data labeled based on the client time reference from the transmission frame; and
means for decoding the synchronized data using the client time reference.

55. The apparatus of claim 54, wherein said means for decoding comprises means for decoding synchronized video frames from the transmission frame.

56. The apparatus of claim 54, wherein said means for decoding comprises means for decoding synchronized audio from the transmission frame.

57. The apparatus of claim 54, wherein said means for receiving comprises means for receiving the transmission frame over the wireless network wherein the wireless network is synchronized to a common time reference.

58. Apparatus for providing time management for mobile media that is distributed over a wireless network, the apparatus comprising:
receiving logic configured to receive a transmission frame over the wireless network using a client time reference that is synchronized to the wireless network;
a decoder configured to obtain synchronized data labeled based on the client time reference from the transmission frame, and to decode the synchronized data using the client time reference.

59. The apparatus of claim 58, wherein said decoder is configured to obtain synchronized video frames from the transmission frame and decode the synchronized video frames using the client time reference.

60. The apparatus of claim 58, wherein said decoder is configured to obtain synchronized audio from the transmission frame and decode the synchronized audio using the client time reference.

61. The apparatus of claim 58, wherein said receiving logic is configured to receive the transmission frame over the wireless network wherein the wireless network is synchronized to a common time reference.

62. A computer-readable medium having a computer program, which when executed by at least one processor, operates to provide time management for mobile media that is distributed over a wireless network, the computer program comprising:
instructions for receiving a transmission frame over the wireless network using a client time reference that is synchronized to the wireless network;
instructions for obtaining synchronized data labeled based on the client time reference from the transmission frame; and instructions for decoding the synchronized data using the client time reference.

63. The computer program of claim 62, wherein said instructions for decoding comprise instructions for decoding synchronized video frames from the transmission frame.

64. The computer program of claim 62, wherein said instructions for decoding comprise instructions for decoding synchronized audio from the transmission frame.

65. The computer program of claim 62, wherein said instructions for receiving comprise instructions for receiving the transmission frame over the wireless network wherein the wireless network is synchronized to a common time reference.

66. At least one processor configured to perform a method for providing time management for mobile media that is distributed over a wireless network, the method comprising:

receiving a transmission frame over the wireless network using a client time reference that is synchronized to the network;

obtaining synchronized data labeled based on the client time reference from the transmission frame; and decoding the synchronized data using the client time reference.

67. The method of claim 66, wherein said decoding comprises decoding synchronized video frames from the transmission frame.

68. The method of claim 66, wherein said decoding comprises decoding synchronized audio from the transmission frame.

69. The method of claim 66, wherein said receiving comprises receiving the transmission frame over the wireless network wherein the wireless network is synchronized to a common time reference.

* * * * *

UNITED STATES PATENT AND TRADEMARK OFFICE
CERTIFICATE OF CORRECTION

PATENT NO. : 7,649,874 B2 Page 1 of 1
APPLICATION NO. : 11/372941
DATED : January 19, 2010
INVENTOR(S) : Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Twenty-eighth Day of December, 2010

David J. Kappos
*Director of the United States Patent and Trademark Office*